(12) United States Patent
Kim et al.

(10) Patent No.: US 11,121,792 B2
(45) Date of Patent: Sep. 14, 2021

(54) RESOURCE ALLOCATION METHOD FOR CONTROLLING INTER-CELL INTERFERENCE IN WIRELESS COMMUNICATION SYSTEM OPERATING IN FLEXIBLE DUPLEX MODE ON A CELL-BY-CELL BASIS, AND APPARATUS THEREFOR

(71) Applicant: LG ELECTRONICS INC., Seoul (KR)

(72) Inventors: Dongkyu Kim, Seoul (KR); Yunjung Yi, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 355 days.

(21) Appl. No.: 16/325,176

(22) PCT Filed: Aug. 4, 2017

(86) PCT No.: PCT/KR2017/008430
§ 371 (c)(1),
(2) Date: Feb. 12, 2019

(87) PCT Pub. No.: WO2018/030713
PCT Pub. Date: Feb. 15, 2018

(65) Prior Publication Data
US 2019/0190636 A1 Jun. 20, 2019

Related U.S. Application Data

(60) Provisional application No. 62/374,717, filed on Aug. 12, 2016.

(51) Int. Cl.
*H04J 11/00* (2006.01)
*H04W 72/08* (2009.01)
(Continued)

(52) U.S. Cl.
CPC ......... *H04J 11/005* (2013.01); *H04J 11/0056* (2013.01); *H04L 5/00* (2013.01);
(Continued)

(58) Field of Classification Search
CPC ....... H04J 11/005; H04J 11/0056; H04L 5/00; H04L 5/14; H04L 27/2666; H04W 72/042; H04W 72/082
See application file for complete search history.

(56) References Cited

U.S. PATENT DOCUMENTS 8,204,442 B2 * 6/2012 Sankar .............. H04W 72/0453
455/63.1
10,512,064 B1 * 12/2019 Singh ................ H04W 72/0413
(Continued)

OTHER PUBLICATIONS

PCT International Application No. PCT/KR2017/008430, Written Opinion of the International Searching Authority dated Dec. 5, 2017, 15 pages.
(Continued)

*Primary Examiner* — Chi H Pham
*Assistant Examiner* — Weibin Huang
(74) *Attorney, Agent, or Firm* — Lee, Hong, Degerman, Kang & Waimey

(57) ABSTRACT

A resource allocation method for controlling, by a base station, inter-cell interference in a wireless communication system operating in a flexible duplex mode on a cell-by-cell basis may comprise the steps of: receiving, from an adjacent base station, information on a resource for downlink only, allocated to an adjacent cell to which the adjacent base station belongs, in a predetermined subframe; and allocating, to terminals in a cell to which the base station belongs, a resource for the cell, which corresponds to the resource for downlink only, allocated to the adjacent cell, as a resource for downlink only, on the basis of the information on the resource.

13 Claims, 18 Drawing Sheets

(51) Int. Cl.
*H04L 5/00* (2006.01)
*H04L 5/14* (2006.01)
*H04L 27/26* (2006.01)
*H04W 72/04* (2009.01)

(52) U.S. Cl.
CPC ............ *H04L 5/14* (2013.01); *H04L 27/2666* (2013.01); *H04W 72/042* (2013.01); *H04W 72/082* (2013.01)

(56) References Cited

U.S. PATENT DOCUMENTS

| | | | | |
|---|---|---|---|---|
| 2009/0069023 | A1* | 3/2009 | Ahn | H04L 5/0044 455/450 |
| 2010/0214997 | A1* | 8/2010 | Tao | H04W 16/12 370/329 |
| 2012/0033570 | A1 | 2/2012 | He et al. | |
| 2012/0230260 | A1 | 9/2012 | Virtej et al. | |
| 2014/0126432 | A1* | 5/2014 | Wang | H04L 5/1469 370/280 |
| 2014/0177485 | A1 | 6/2014 | Wang et al. | |
| 2015/0249530 | A1 | 9/2015 | Zhang et al. | |
| 2016/0143042 | A1* | 5/2016 | Nagata | H04W 72/0446 370/329 |
| 2017/0310435 | A1* | 10/2017 | Wei | H04L 5/0007 |
| 2018/0352465 | A1* | 12/2018 | Song | H04B 7/0626 |

OTHER PUBLICATIONS

LG Electronics, "Consideration of Flexible and Full duplex operation in NR design", 3GPP TSG RAN WG1 Meeting #85, R1-164562, May 2016, 4 pages.

* cited by examiner

FIG. 16
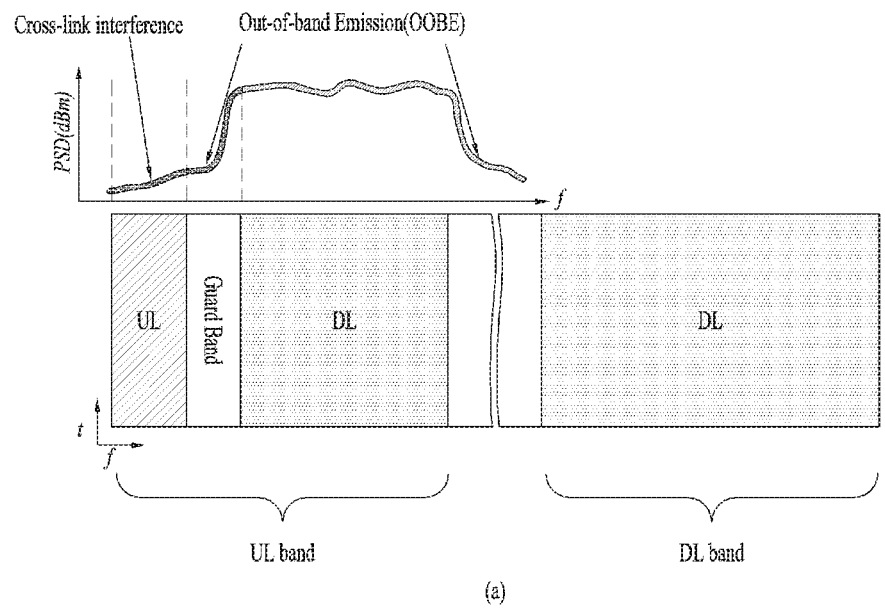
(a)
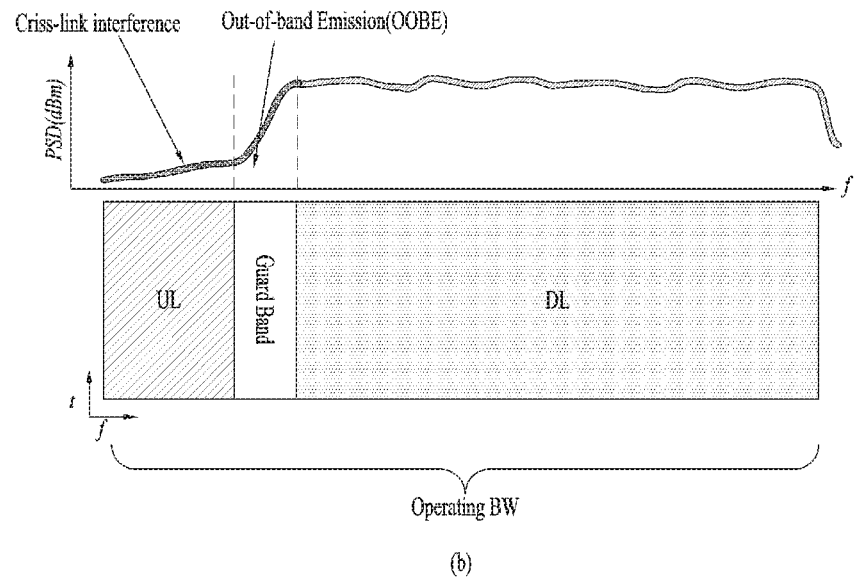
(b)

FIG. 17
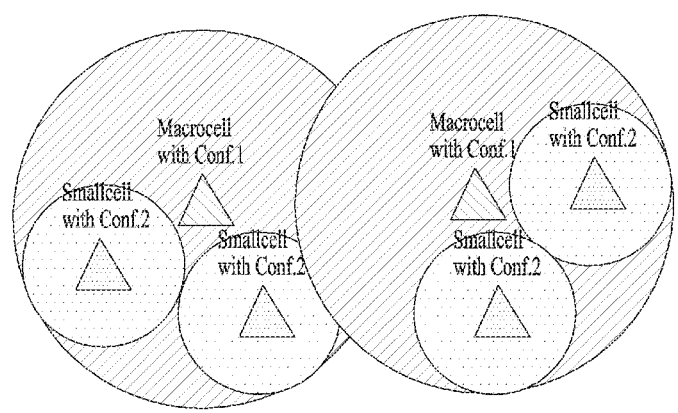
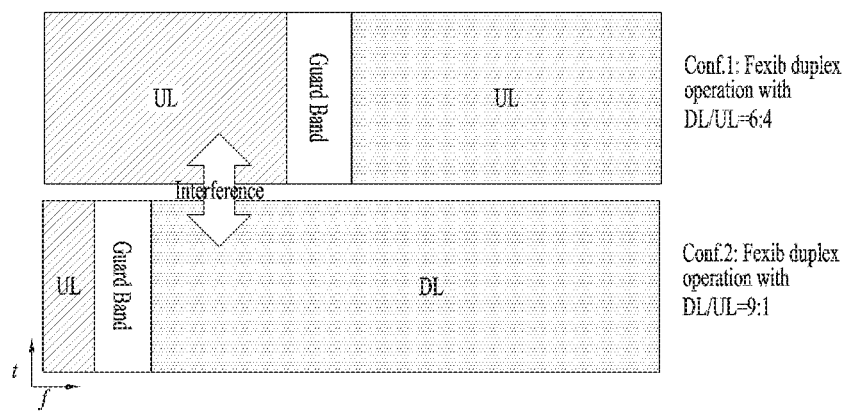
Conf.1: Fexib duplex
operation with
DL/UL=6:4
Conf.2: Fexib duplex
operation with
DL/UL=9:1

FIG. 18
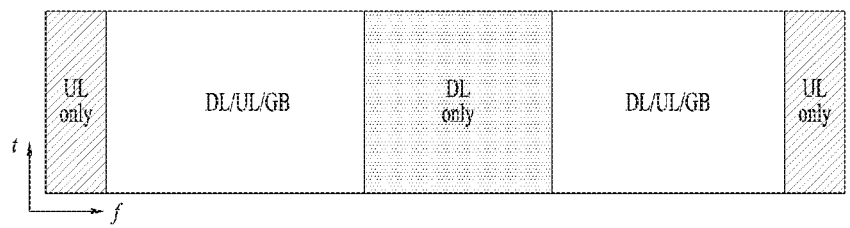
FIG. 19
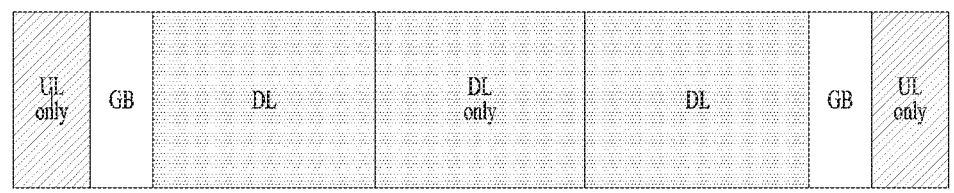
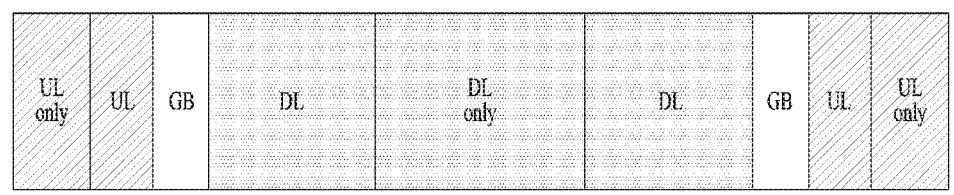
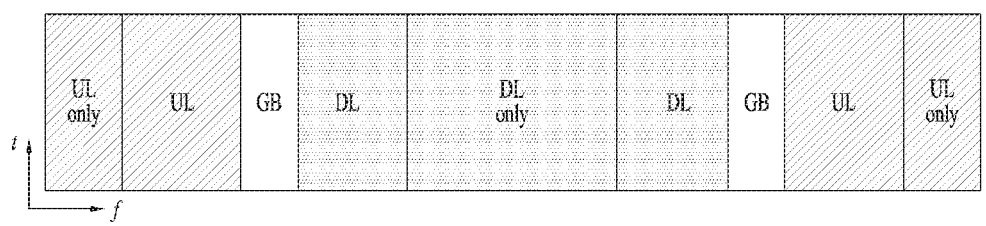

RESOURCE ALLOCATION METHOD FOR CONTROLLING INTER-CELL INTERFERENCE IN WIRELESS COMMUNICATION SYSTEM OPERATING IN FLEXIBLE DUPLEX MODE ON A CELL-BY-CELL BASIS, AND APPARATUS THEREFOR

CROSS-REFERENCE TO RELATED APPLICATIONS

This application is the National Stage filing under 35 U.S.C. 371 of International Application No. PCT/KR2017/008430, filed on Aug. 4, 2017, which claims the benefit of U.S. Provisional Application No. 62/374,717, filed on Aug. 12, 2016, the contents of which are all hereby incorporated by reference herein in their entirety.

TECHNICAL FIELD

The present invention relates to wireless communication, and more particularly, to a method of allocating a resource for controlling inter-cell interference in a wireless communication system operating in flexible duplex mode per cell and apparatus therefor.

BACKGROUND ART

Compared to conventional half duplex communication in which time or frequency resources are divided orthogonally, full duplex communication doubles a system capacity in theory by allowing a node to perform transmission and reception simultaneously.

FIG. 1 is a conceptual view of a UE and a Base Station (BS) which support Full Duplex Radio (FDR).

In the FDR situation illustrated in FIG. 1, the following three types of interference are produced.

Intra-Device Self-Interference:

Because transmission and reception take place in the same time and frequency resources, not only a desired signal but also a signal transmitted from a BS or UE are received at the same time at the BS or UE. The transmitted signal is received with almost no attenuation at a Reception (Rx) antenna of the BS or UE, and thus with much larger power than the desired signal. As a result, the transmitted signal serves as interference.

UE to UE Inter-Link Interference:

An Uplink (UL) signal transmitted by a UE is received at an adjacent UE and thus serves as interference.

BS to BS Inter-Link Interference:

Signals transmitted between BSs or heterogeneous BSs (picocell, femtocell, and relay node) in a HetNet state are received by an Rx antenna of another BS, and serve as interference.

DISCLOSURE OF THE INVENTION

Technical Tasks

One technical task achieved by the present invention is to provide a method of allocating a resource for controlling inter-cell interference in a wireless communication system operating in flexible duplex mode per cell.

Another technical task achieved by the present invention is to provide an apparatus for allocating a resource for controlling inter-cell interference in a wireless communication system operating in flexible duplex mode per cell.

Technical tasks obtainable from the present invention are non-limited the above-mentioned technical task. And, other unmentioned technical tasks can be clearly understood from the following description by those having ordinary skill in the technical field to which the present invention pertains.

Technical Solutions

In one technical aspect of the present invention, provided herein is a method of allocating a resource for a base station to control inter-cell interference in a wireless communication system operating in flexible duplex mode per cell, the method including receiving information on a resource only for downlink allocated for an adjacent cell having an adjacent base station belong thereto in a prescribed subframe from the adjacent base station and allocating a resource of a cell, to which the base station belongs, corresponding to the resource only for the downlink allocated to the adjacent cell to user equipments within the base station belonging cell as a resource only for downlink based on the information on the resource.

The resource only for the downlink allocated to the base station belonging cell may be allocated to a partial frequency band in a bandwidth of the prescribed subframe. If bandwidths used by the wireless communication system and a different wireless communication system are adjacent to both edges of the bandwidth, both edge bands of the bandwidth may be allocated as a resource only for uplink. The information on the resource further may include one of an identifier of the adjacent base station, information on a Guard Band (GB), time information operating in the flexible duplex mode, and frequency information operating in the flexible duplex mode. Both edge bands of the prescribed frame may be allocated as a resource only for uplink. When the adjacent base station receives uplink, if a level of interference caused to the adjacent base station by the base station exceeds a prescribed threshold, the information on the resource may be received from the adjacent base station. If reliability of a signal received by the adjacent base station becomes lower than a prescribed threshold, the information on the resource may be received from the adjacent base station. The method may further include transmitting the information on the resource to the UE within the base station belonging cell.

In another technical aspect of the present invention, provided herein is a base station in performing resource allocation to control inter-cell interference in a wireless communication system operating in flexible duplex mode per cell, the base station including a receiver configured to receive information on a resource only for downlink allocated for an adjacent cell having an adjacent base station belong thereto in a prescribed subframe from the adjacent base station and a processor configured to allocate a resource of a cell, to which the base station belongs, corresponding to the resource only for the downlink allocated to the adjacent cell to user equipments within the base station belonging cell as a resource only for downlink based on the information on the resource.

The processor may allocate the resource only for the downlink allocated to the base station belonging cell to a partial frequency band in a bandwidth of the prescribed subframe. If bandwidths used by the wireless communication system and a different wireless communication system are adjacent to both edges of the bandwidth, the processor may allocate both edge bands of the bandwidth as a resource only for uplink.

The information on the resource may further include one of an identifier of the adjacent base station, information on a Guard Band (GB), time information operating in the flexible duplex mode, and frequency information operating in the flexible duplex mode.

The processor may allocate both edge bands of the prescribed frame as a resource only for uplink. When the adjacent base station receives uplink, if a level of interference caused to the adjacent base station by the base station exceeds a prescribed threshold, the receiver may receive the information on the resource from the adjacent base station. If reliability of a signal received by the adjacent base station becomes lower than a prescribed threshold, the receiver may receive the information on the resource from the adjacent base station. The base station may further include a transmitter configured to transmit the information on the resource to the UE within the base station belonging cell.

Advantageous Effects

According to one embodiment of the present invention, in case of operating in flexible duplex mode per cell, communication performance can be improved by controlling inter-cell interference efficiently.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention.

FIG. 16 is a diagram showing an example of an interface of a flexible duplex operation of FDM.

FIG. 17 is a diagram of an example to describe interference possibly generated when a base station operating by flexible duplex having a different DL/UL portion is located in an adjacent area.

FIG. 18 is a diagram showing one example of a frame structure having a DL only band and a UL only band.

FIG. 19 is a diagram showing one example when a DL/UL portion is changed in the frame structure having the DL only band and the UL only band shown in FIG. 18.

FIG. 22 is a diagram showing one example when a DL/UL portion is changed in a self-contained frame structure having a DL only band and a UL only band.

FIG. 23 is a diagram showing one example of configuring a UL only region to reduce interference caused to LTE system located on an adjacent band in a self-contained frame structure having a DL only band and a UL only band.

BEST MODE FOR INVENTION

Figure 1:
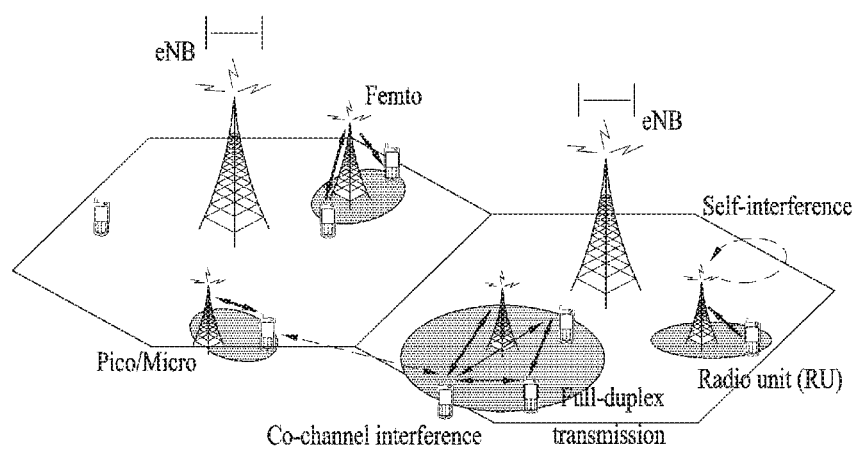
FIG. 1 is an exemplary diagram of a network supportive of a full/half duplex communication operation scheme of a user equipment proposed by the present invention.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

Figure 2:
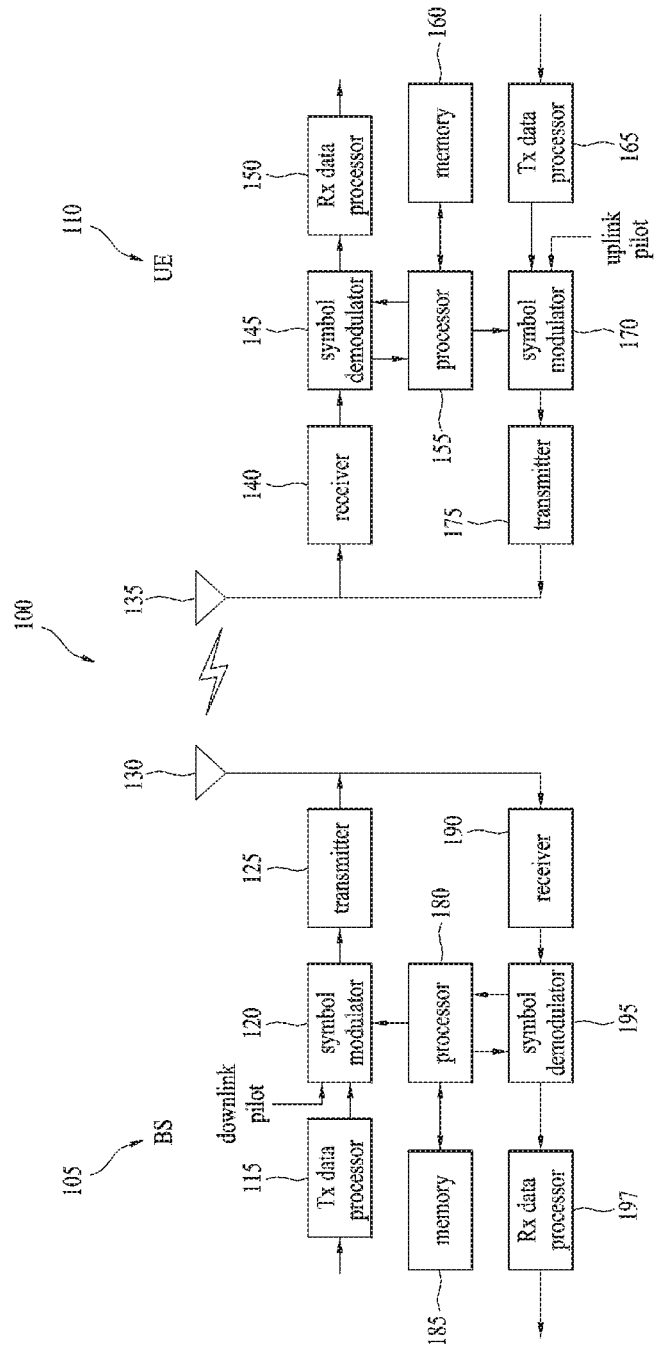
FIG. 2 is a block diagram showing configurations of a base station 105 and a user equipment 110 in a wireless communication system 100.

FIG. 2 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 2, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 3:
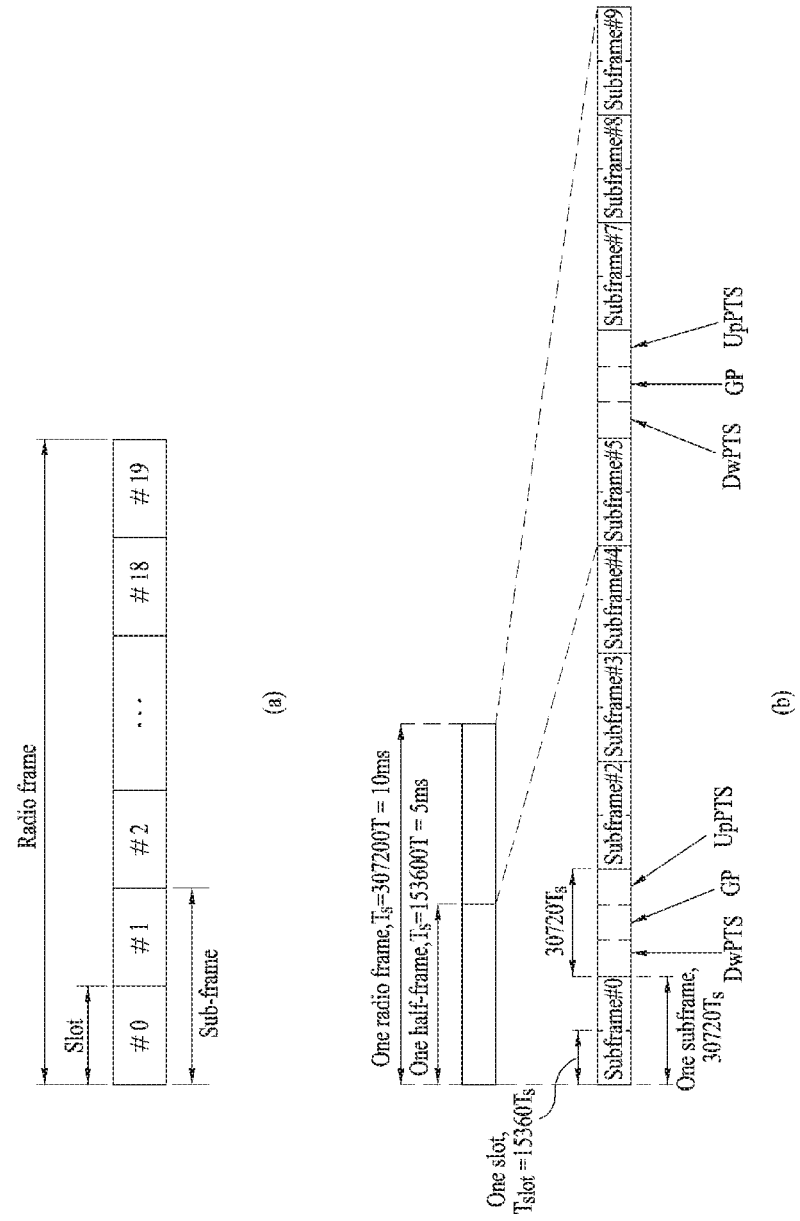
FIG. 3 is a diagram showing a structure of a radio frame used in 3GPP LTE/LTE-A system as one example of a wireless communication system.

FIG. 3 is a diagram showing the structure of a radio frame used in a 3GPP LTE/LTE-A system which is an example of a wireless communication system.

As a general wireless transmission method, for wireless transmission between a base station and a wireless user equipment (UE) as wireless devices, transmission from the base station to the wireless UE is referred to as downlink transmission and transmission from the wireless UE to the base station is referred to as uplink transmission. A scheme for dividing radio resources between downlink transmission and uplink transmission is defined as "duplex". Bidirectional transmission and reception in a state of dividing a frequency band into a downlink transmission band and an uplink transmission band is referred to as frequency division duplex (FDD) and transmission and reception in a state of dividing a time-domain radio resources into downlink time duration resources and uplink time duration resources in the same frequency band is referred to as time division duplex (TDD).

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports a type-1 radio frame structure applicable to frequency division duplex (FDD) and a type-2 radio frame structure applicable to time division duplex (TDD).

FIG. 3(a) illustrates the type-1 radio frame structure. A downlink radio frame is divided into ten subframes. Each subframe includes two slots in the time domain. The time required to transmit one subframe is defined as a transmission time interval (TTI). For example, a subframe may have a duration of 1 ms and one slot may have a duration of 0.5 ms. A slot may include a plurality of OFDM symbols in the time domain and a plurality of resource blocks (RBs) in the frequency domain. Since 3GPP LTE employs OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol is extended and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first three OFDM symbols of each subframe may be allocated to a physical downlink control channel (PDCCH) and the other OFDM symbols may be allocated to a physical downlink shared channel (PDSCH).

FIG. 3(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in a base station and UL transmission synchronization in a UE. The GP is provided to cancel interference generated on UL due to multipath delay of a DL signal between DL and UL.

Each half frame includes 5 subframes, a subframe "D" is a subframe for downlink transmission, a subframe "U" is a subframe for uplink transmission, and a subframe "S" is a special subframe including a DwPTS (Downlink Pilot Time Slot), a guard period (GP) and a UpPTS (Uplink Pilot Time Slot). The DwPTS is used for initial cell search, synchronization, or channel estimation in a UE, whereas the UpPTS is used for channel estimation in a base station and UL transmission synchronization in a UE. The GP is provided to cancel interference generated in UL due to multipath delay of a DL signal between DL and UL.

The special subframe S is present in each half frame in the case of a 5-ms downlink-uplink switch-point period and is present only in a first half frame in the case of a 5-ms downlink-uplink switch-point period. Subframe indices 0 and 5 and DwPTS are used for only downlink transmission. A subframe immediately after the UpPTS and the special subframe is always used for uplink transmission. If multiple cells are aggregated, the UE may assume the same uplink-downlink configuration over all cells and the GPs of the special subframes in different cells overlap by at least 1456 Ts. The radio frame structures are merely examples, and various modifications may be made to the number of subframes included in a radio frame, the number of slots included in a subframe, or the number of symbols included in a slot.

[Table 1] below shows the configuration of the special frames (length of DwPTS/GP/UpPTS).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Table 2 below shows an uplink-downlink configuration in type-2 frame structure in a 3GPP LTE system.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to [Table 2], in the 3GPP LTE system, there are seven uplink-downlink configurations in the type-2 frame structure. The location or number of downlink subframes, special frames or uplink subframes may be changed according to configuration. Various embodiments of the present invention will hereinafter be described centering upon UL-DL configurations of a Type-2 frame structure shown in Table 2. The following Table 3 illustrates k values of TDD configurations 0~6.

TABLE 3

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | | | 7 | 4 | | | | 7 | 4 | |
| 1 | | | 4 | | | 6 | | | 4 | 6 |
| 2 | | | 6 | | | | | 6 | | |
| 3 | 6 | | | | | | | | 6 | 6 |
| 4 | | | | | | | | | 6 | 6 |
| 5 | | | | | | | | | 6 | |
| 6 | | | 6 | 4 | | | | 7 | 4 | 6 |

HARQ-ACK received over a PHICH allocated to a UE at the subframe (i) in a Type-1 frame structure may be associated with PUSCH transmission at the subframe (1~4). In Type-2 frame structure UL/DL configurations 1~6, HARQ-ACK received over a PHICH allocated to the UE at the subframe (i) may be associated with PUSCH transmission at the subframe i-k (where k is shown in Table 3).

A UE HARQ-ACK procedure for use in the 3GPP LTE/LTE-A system will hereinafter be described. The present invention will be disclosed centering upon the UE HARQ-ACK procedure for use in the 3GPP LTE/LTE-A system.

TABLE 4

For Frame Structure type 2 UL/DL configuration 1-6, an HARQ-ACK received on the PHICH assigned to a UE in subframe i is associated with the PUSCH transmission in the subframe i-k as indicated by the table 3.
For Frame Structure type 2 UL/DL configuration 0, an HARQ-ACK received on the PHICH in the resource corresponding to $I_{PHICH} = 0$, assigned to a UE in subframe i is associated with the PUSCH transmission in the subframe i-k as indicated by the table 3.
If, for Frame Structure type 2 UL/DL configuration 0, an HARQ-ACK received on the PHICH in the resource corresponding to $I_{PHICH} = 1$, assigned to a UE in subframe i is associated with the PUSCH transmission in the subframe i-6.
The physical layer in the UE shall deliver indications to the higher layers as follows:
For downlink subframe i, if a transport block was transmitted in the associated PUSCH subframe then:
   if ACK is decoded on the PHICH corresponding to the transport block in subframe i, ACK for that transport block shall be delivered to the higher layers;
   else NACK for that transport block shall be delivered to the higher layers.
For downlink subframe i, in case of a retransmission in the associated PUSCH subframe, if a transport block was disabled in the associated PUSCH subframe then ACK for that transport block shall be delivered to the higher layers.

The PHICH assignment procedure for use in the 3GPP LTE/LTE-A system will hereinafter be described. The present invention will be disclosed centering upon the PHICH assignment procedure for use in the 3GPP LTE/LTE-A system.

Figure 5:
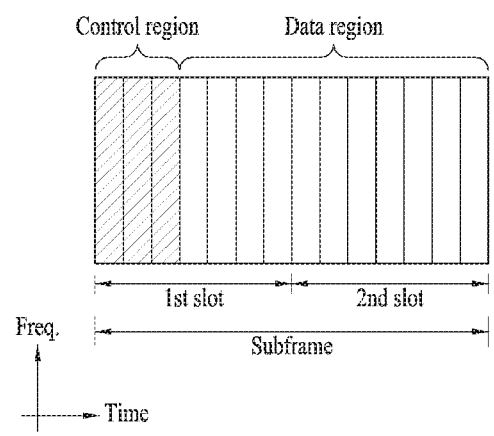
FIG. 5 is a diagram showing a downlink structure used in 3GPP LTE/LTE-A system as one example of a wireless communication system.

FIG. 5 is a diagram showing the structure of a downlink subframe used in a 3GPP LTE/LTE-A system which is an example of a wireless communication system.

Referring to FIG. 5, a maximum of three (four) OFDM symbols located in a front portion of a first slot within a subframe corresponds to the control region to which a control channel is allocated. The remaining OFDM symbols correspond to the data region to which a physical downlink shared chancel (PDSCH) is allocated. Examples of downlink control channels used in LTE include a physical control format indicator channel (PCFICH), a physical downlink control channel (PDCCH), a physical hybrid ARQ indicator channel (PHICH), etc. The PCFICH is transmitted on a first OFDM symbol of a subframe and carries information regarding the number of OFDM symbols used for transmission of control channels within the subframe. The PHICH is a response to uplink transmission and carries a HARQ acknowledgment (ACK)/negative acknowledgment (NACK) signal.

Control information carried on the PDCCH is called downlink control information (DCI). As a DCI format, format 0 for uplink and formats 1, 1A, 1B, 1C, 1D, 2, 2A, 3 and 3A for downlink are defined. The DCI format selectively includes a hopping flag, RB allocation, modulation coding scheme (MCS), redundancy version (RV), new data indicator (NDI), transmit power control (TPC), cyclic shift demodulation reference signal (DMRS), channel quality information (CQI) request, HARQ process number, trans-

TABLE 5

For PUSCH transmissions scheduled from serving cell in subframe n, a UE shall determine the corresponding PHICH resource of serving cell c in subframe n + $k_{PHICH}$, where $k_{PHICH}$ is always 4 for FDD and is given in following table 6 for TDD. For subframe bundling operation, the corresponding PHICH resource is associated with the last subframe in the bundle.
The PHICH resource is identified by the index pair $(n_{PHICH}^{group}, n_{PHICH}^{seq})$ where $n_{PHICH}^{group}$ is the PHICH group number and $n_{PHICH}^{seq}$ is the orthogonal sequence index within the group as defined by:

$$n_{PHICH}^{group} = (I_{PRB\_RA} + n_{DMRS}) \bmod n_{PHICH}^{group} + I_{PHICH} n_{PHICH}^{group}$$

$$n_{PHICH}^{seq} = (\lfloor I_{PRB\_RA} / n_{PHICH}^{group} \rfloor + n_{DMRS}) \bmod 2n_{SF}^{PHICH}$$

where
$n_{DMRS}$ is mapped from the cyclic shift for DMRS field (according to following table 6) in the most recent PDCCH with uplink DCI format [4] for the transport block(s) associated with the corresponding PUSCH transmission. $n_{DMRS}$ shall be set to zero, if there is no PDCCH with uplink DCI format for the same transport block, and if the initial PUSCH for the same transport block is semi-persistently scheduled, or if the initial PUSCH for the same transport block is scheduled by the random access response grant.
$n_{SF}^{PHICH}$ is the spreading factor size used for PHICH modulation as described in section 6.9.1 in [3].

$$I_{PRB\_RA} = \begin{cases} I_{PRB\_RA}^{lowest\_index} & \text{for the first TB of a PUSCH with associated PDCCH or for the case of no associated PDCCH when the number of negatively acknowledged TBs is not equal to the number of TBs indicated in the most recent PDCCH associated with the corresponding PUSCH} \\ I_{PRB\_RA}^{lowest\_index} + 1 & \text{for the second TB of a PUSCH with associated PDCCH} \end{cases}$$

where $I_{PBR\_RA}^{lowest\_index}$ is the lowest PRB index in the first slot of the corresponding PUSCH transmission
$n_{PHICH}^{group}$ is the number of PHICH groups configured by higher layers as described in section 6.9 of [3], $$I_{PHICH} = \begin{cases} 1 & \text{for TDD UL/DL configuration 0 with PUSCH transmission in subframe n = 4 or 9} \\ 0 & \text{otherwise} \end{cases}$$

TABLE 6

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

Figure 4:
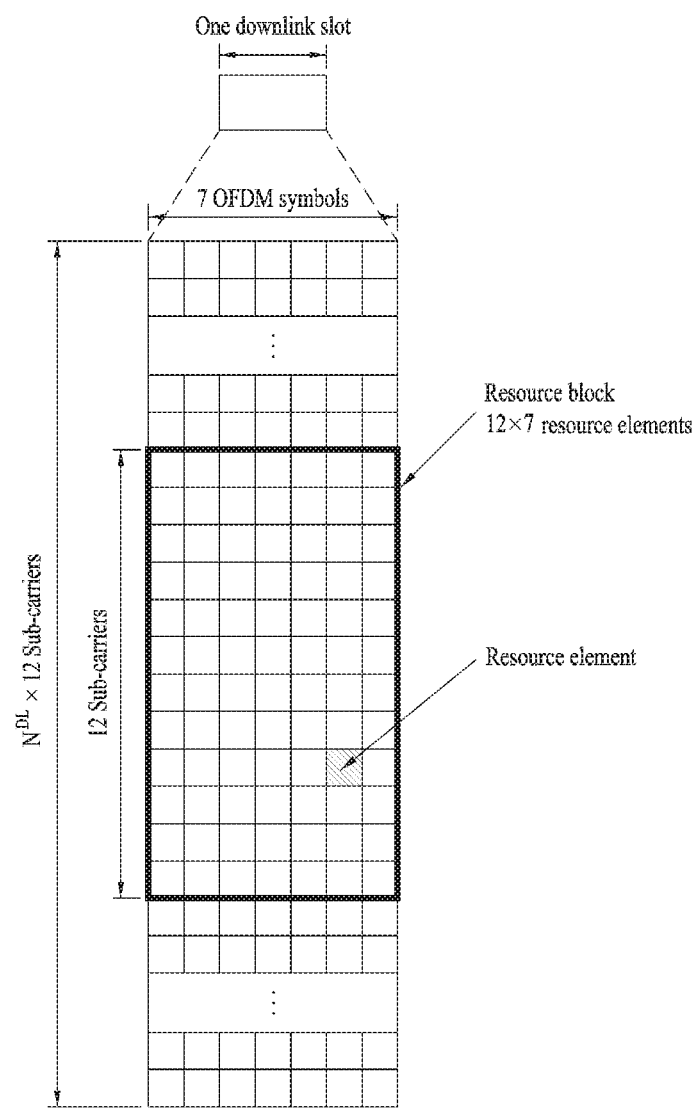
FIG. 4 is a diagram showing a resource grid of a downlink slot of 3GPP LTE/LTE-A system as one example of a wireless communication system.

FIG. 4 is a diagram showing a resource grid of a downlink slot of a 3GPP LTE/LTE-A system which is an example of a wireless communication system.

Referring to FIG. 4, a DL slot includes a plurality of OFDM symbols in the time domain. One DL slot includes 7 (or 6) OFDM symbols and an RB includes 12 subcarriers in the frequency domain. Each element of the resource grid is referred to as a Resource Element (RE). An RB includes 12×7(6) REs. The number NRB of RBs included in a DL slot depends on a DL transmission bandwidth. A UL slot may have the same structure as a DL slot, except that an OFDM symbol is replaced with an SC-FDMA symbol.

mitted precoding matrix indicator (TPMI), precoding matrix indicator (PMI) confirmation, etc. according to usage thereof.

The PDCCH may deliver information about resource allocation and a transport format for a Downlink Shared Channel (DL-SCH), information about resource allocation and a transport format for an Uplink Shared Channel (UL-SCH), paging information of a Paging Channel (PCH), system information on the DL-SCH, information about resource allocation for a higher-layer control message such as a random access response transmitted on the PDSCH, a set of Tx power control commands for individual UEs of a UE group, a Tx power control command, Voice Over Internet Protocol (VoIP) activation indication information, etc. A plurality of PDCCHs may be transmitted in the control region. The UE may monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). The format of the PDCCH and the number of PDCCH bits are determined according to the number of CCEs. The base station determines a PDCCH format according to DCI to be transmitted to the UE and attaches cyclic redundancy check to control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by an ID (e.g. a cell-RNTI (C-RNTI)) of the UE. If the PDCCH carries a paging message, the CRC may be masked by a paging ID (e.g. a Paging-RNTI (P-RNTI)). If the PDCCH carries system information, particularly, a System Information Block (SIB), the CRC may be masked by a system information ID (e.g. a System Information RNTI (SI-RNTI)). If the PDCCH is for a random access response, the CRC may be masked by a Random Access-RNTI (RA-RNTI).

Figure 6:
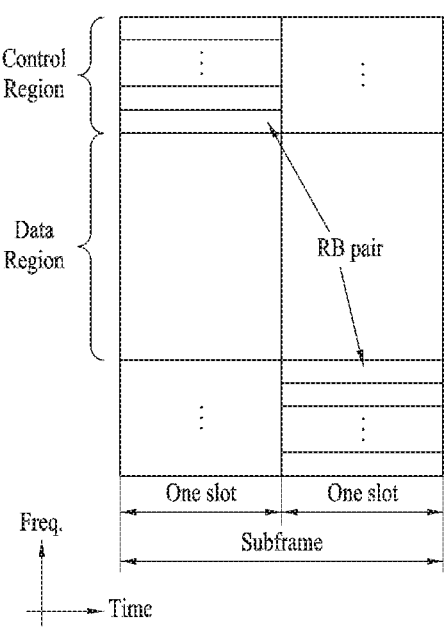
FIG. 6 is a diagram showing a structure of an uplink subframe used in 3GPP LTE/LTE-A system as one example of a wireless communication system.

FIG. 6 is a diagram showing the structure of an uplink subframe used in a 3GPP LTE/LTE-A system which is an example of a wireless communication system.

Referring to FIG. 6, the UL subframe includes a plurality (e.g., two) of slots. The slot may include SC-FDMA symbols, the number of which is changed according to CP length. The UL subframe is divided into a control region and a data region in the frequency domain. The data region includes a physical uplink shared channel (PUSCH) and is used to transmit a data signal such as voice. The control region includes a physical uplink control channel (PUCCH) and is used to transmit uplink control information (UCI). The PUCCH includes an RB pair located at both ends of the data region on the frequency axis and hops over a slot boundary.

The PUCCH can be used to transmit the following control information.

Scheduling Request (SR): This is information used to request a UL-SCH resource and is transmitted using an On-Off Keying (OOK) scheme.

HARQ ACK/NACK: This is a response signal to a downlink data packet on a PDSCH and indicates whether the downlink data packet has been successfully received. A 1-bit of ACK/NACK signal is transmitted as a response to a single downlink codeword (CW), and a 2-bits of ACK/NACK signal is transmitted in response to two downlink codewords.

Channel Quality Indicator (CQI): This is feedback information about a downlink channel Feedback information regarding MIMO includes a rank indicator (RI), a precoding matrix indicator (PMI), a precoding type indicator (PTI), etc. 20 bits are used per subframe.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports seven formats according to information transmitted thereon.

Spectral, efficiency of, the FDR Tx/Rx system capable of simultaneously transmitting and receiving UL and DL signals on the same frequency band can be increased up to 2 times as compared to that of the legacy system for transmitting/receiving UL and DL signals through division of frequency or time, such that the FDR Tx/Rx system has been highlighted as a core technology of the next-generation 5G mobile communication system.

FDR based on a single frequency transmission band may be defined by a transmission resource configuration scheme capable of simultaneously performing transmission and reception through a single frequency transmission band from the viewpoint of an arbitrary wireless device. As a special example of the FDR, wireless communication between a general BS (or a repeater, a relay, node, a remote radio head (RRH), etc.) and a UE can be represented as a Tx resource configuration scheme capable of simultaneously performing not only DL transmission and UL reception of the BS, but also DL reception and UL transmission of a UE through a single frequency Tx band. In another example, under D2D (Device-to-Device) direct communication between the UEs, such wireless communication may be represented as a Tx resource configuration scheme in which Tx and Rx operations between the UEs are simultaneously performed on the same frequency Tx band. Although the following description will disclose exemplary wireless Tx/Rx between a general BS and a UE indicating a wireless terminal and FDR associated technologies for convenience of description, the scope of the present invention may also be applied to a network UE capable of performing wireless Tx/Rx between a general BS and a UE, and may further include an example of D2D direct communication as necessary.

Figure 7:
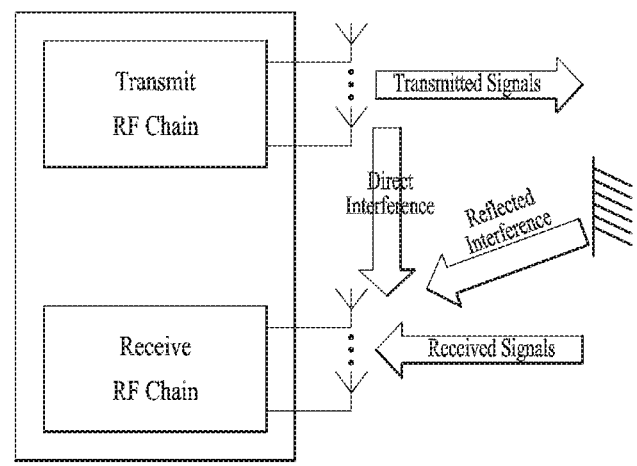
FIG. 7 is a diagram showing the concept of Tx/Rx link and Self-Interference (SI) in FR communication situation.

FIG. 7 is a diagram showing the concept of a transmission/reception link and self-interference (SI) in an FDR communication situation.

As shown in FIG. 7, SI may be divided into direct interference caused when a signal transmitted from a transmit antenna directly enters a receive antenna without path attenuation, and reflected interference reflected by peripheral topology, and the level thereof is dramatically greater than a desired signal due to a physical distance difference. Due to the dramatically large interference intensity, efficient SI cancellation is necessary to operate the FDR system.

To effectively operate the FDR system, self-IC requirements with respect to the maximum transmission power of devices (in the case where FDR is applied to a mobile communication system (BW=20 MHz)) may be determined as illustrated in [Table 7] below.

TABLE 7

| Node Type | Max. Tx Power ($P_A$) | Thermal Noise. (BW = 20 MHz) | Receiver NF | Receiver Thermal Noise Level | Self-IC Target ($P_A$-TN-NF) |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB (for UE) | −92 dBm | 115 dB |

Referring to Table 7, it may be noted that to effectively operate the FUR system in a 20-MHz BW, a UE needs 119-dBm Self-IC performance. A thermal noise value may be changed to $N_{0,BW}$=−174 dBm+10×$\log_{10}$(BW) according to the BW of a mobile communication system. In Table 7, the thermal noise value is calculated on the assumption of a 20-MHz BW. In relation to Table 3, for Receiver Noise Figure (NF), a worst case is considered referring to the 3GPP specification requirements. Receiver Thermal Noise Level is determined to be the sum of a thermal noise value and a receiver NF in a specific BW.

Types of Self-IC Schemes and Methods for Applying the Self-IC Schemes

Figure 8:
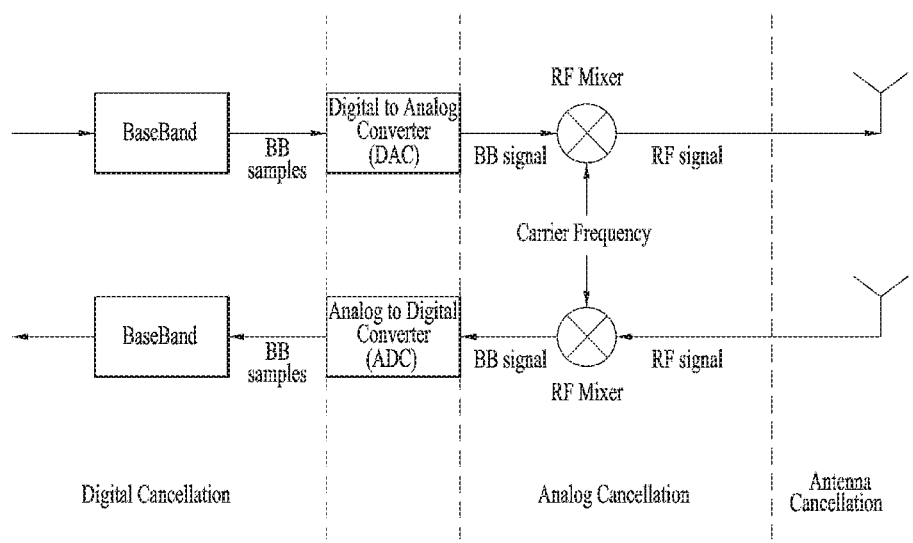
FIG. 8 is a diagram showing a location to which three kinds of interference schemes are applied in RF Tx/Rx end (or RF front end) of a device.

FIG. 8 is a view illustrating positions at which three Self-IC schemes are applied, in a Radio Frequency (RF) Tx and Rx end (or an RF front end) of a device. Now, a brief description will be given of the three Self-IC schemes.

Antenna Self-IC: Antenna Self-IC is a Self-IC scheme that should be performed first of all Self-IC schemes. SI is cancelled at an antenna end. Most simply, transfer of an SI signal may be blocked physically by placing a signal-blocking object between a Tx antenna and an Rx antenna, the distance between antennas may be controlled artificially, using multiple antennas, or a part of an SI signal may be canceled through phase inversion of a specific Tx signal. Further, a part of an SI signal may be cancelled by means of multiple polarized antennas or directional antennas.

Analog Self-IC: Interference is canceled at an analog end before an Rx signal passes through an Analog-to-Digital Convertor (ADC). An SI signal is canceled using a duplicated analog signal. This operation may be performed in an RF region or an Intermediate Frequency (IF) region. SI signal cancellation may be performed in the following specific method. A duplicate of an actually received SI signal is generated by delaying an analog Tx signal and controlling the amplitude and phase of the delayed Tx signal, and subtracted from a signal received at an Rx antenna. However, due to the analog signal-based processing, the resulting implementation complexity and circuit characteristics may cause additional distortion, thereby changing interference cancellation performance significantly.

Digital Self-IC: Interference is canceled after an Rx signal passes through an ADC. Digital Self-IC covers all IC techniques performed in a baseband region. Most simply, a duplicate of an SI signal is generated using a digital Tx signal and subtracted from an Rx digital signal. Or techniques of performing precoding/postcoding in a baseband using multiple antennas so that a Tx signal of a UE or an eNB may not be received at an Rx antenna may be classified into digital Self-IC. However, since digital Self-IC is viable only when a digital modulated signal is quantized to a level enough to recover information of a desired signal, there is a need for the prerequisite that the difference between the signal powers of a designed signal and an interference signal remaining after interference cancellation in one of the above-described techniques should fall into an ADC range, to perform digital Self-IC.

Figure 9:
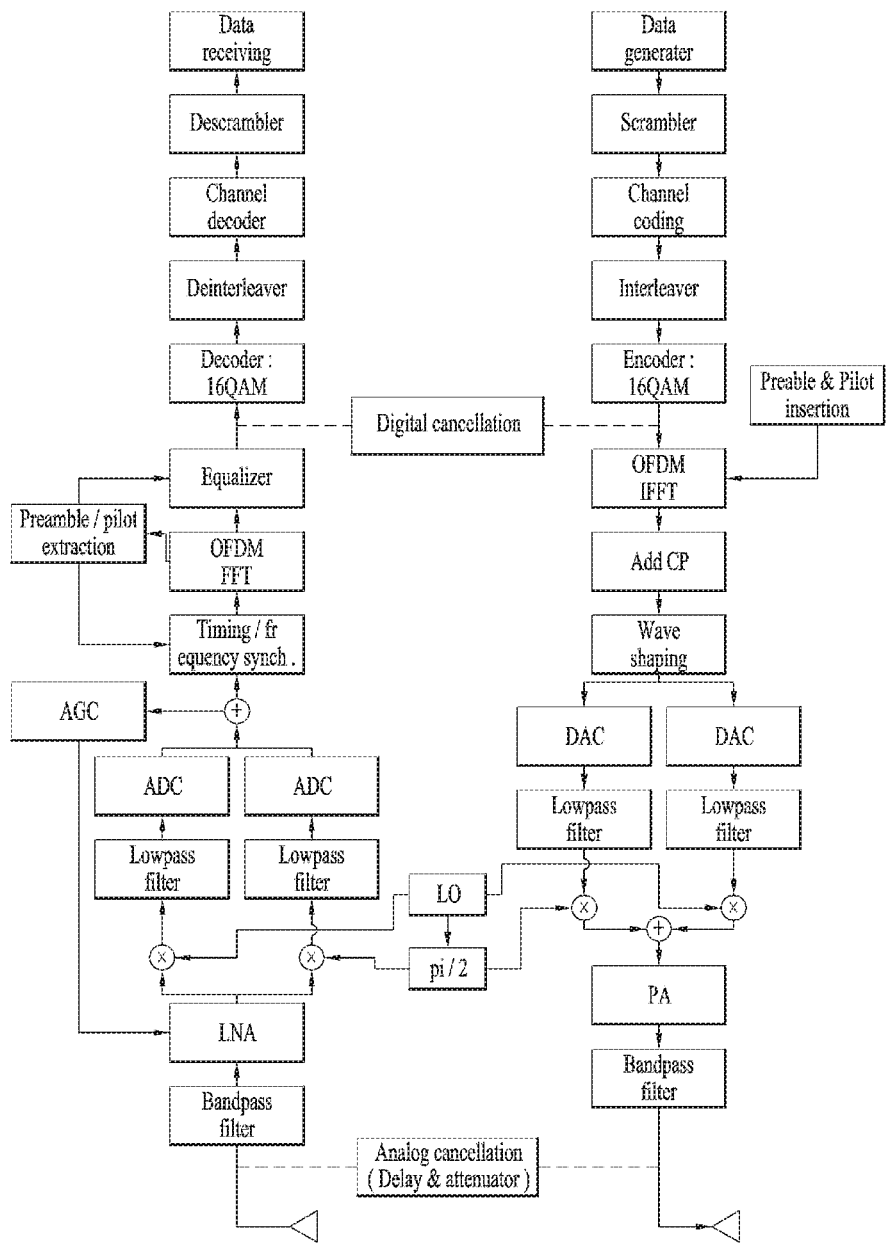
FIG. 9 is a block diagram of a device for Self-Interference Cancellation (SI-C) in a communication device provided in a communication system environment using OFDM based on FIG. 8.

FIG. 9 is a block diagram of a Self-IC device in a proposed communication apparatus in an OFDM communication environment based on FIG. 8.

While FIG. 9 shows that digital Self-IC is performed using digital SI information before Digital to Analog Conversion (DAC) and after ADC, it may be performed using a digital SI signal after Inverse Fast Fourier Transform (IFFT) and before Fast Fourier Transform (FFT). Further, although FIG. 9 is a conceptual view of Self-IC though separation of a Tx antenna from an Rx antenna, if antenna Self-IC is performed using a single antenna, the antenna may be configured in a different manner from in FIG. 5.

The 3GPP LTE system operates in a predetermined fixed UL/DL band in both TDD and FDD, as illustrated in [Table 8] below. While a TDD configuration may be determined cell-specifically in TDD, predetermined UL and DL bands are located in different frequency bands, each band serving only one of the usages of UE transmission and BS transmission so that a signal may not be transmitted in the other band than defined for the signal in FDD. [Table 8] lists E-UTRA frequency bands.

TABLE 8

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |

TABLE 8-continued

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 6[1] | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | |
| 21 | 1447.9 MHz-1462.9 MHz | 1495.9 MHz-1510.9 MHz | FDD |
| 24 | 1626.5 MHz-1660.5 MHz | 1525 MHz-1559 MHz | FDD |
| . . . | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |

Note 1:
Band 6 is not applicable.

However, an actual data environment for a UE is characterized by asymmetric data traffic, and DL data traffic occupies a larger proportion than UL data traffic in most communication environments. It has been reported that the ratio between the amount of UL traffic and the amount of DL traffic is 1:9. In this asymmetric data traffic environment, an FDD-LTE operation based on fixed frequency allocations for UL transmission and DL transmission as illustrated in [Table 8] above may decrease resource utilization. To avert this problem, a Flexible FDD wireless transmission scheme has been proposed as an initial stage for a full duplex radio (FDR) system.

Flexible FDD is a technology seeking to increase resource use efficiency adaptively to a UE's traffic environment by using a UL band as a DL band for a specific time in light of release of regulations on operations of an FDD system according to actual asymmetric data traffic characteristics. The legacy FDD-LTE wireless transmission scheme and the Flexible FDD wireless transmission scheme are compared in terms of resource use efficiency in FIG. 10.

Figure 10:
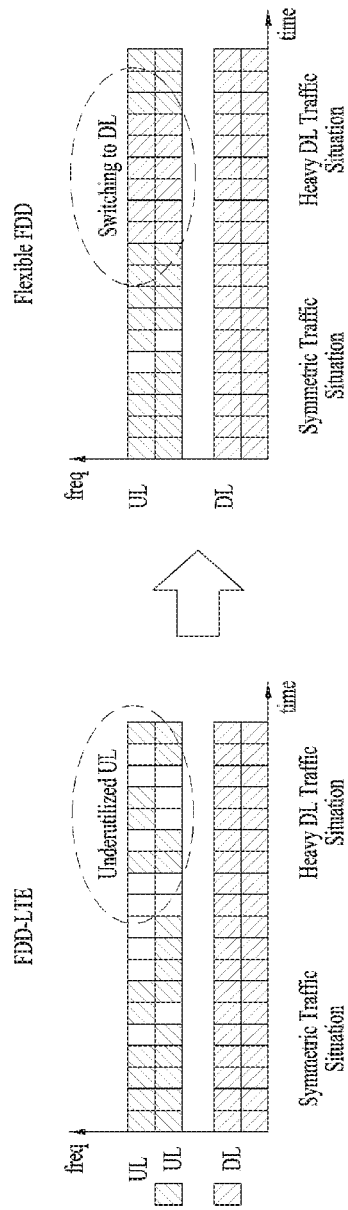
FIG. 10 is a diagram showing comparison of resource use efficiency between the legacy FDD-LTE and Flexible FDD wireless transmission (symmetric traffic situation and heavy DL data traffic situation).

FIG. 10 is a view illustrating a comparison of resource use efficiency in the legacy FDD-LTE wireless transmission scheme and the Flexible FDD wireless transmission scheme in case of a symmetric traffic situation and a heavy DL data traffic situation.

As shown in FIG. 10, in the symmetric data traffic environment, the resource use efficiency is high, because most of DL and UL resources are used. On the contrary, it is apparent from FIG. 10 that FDD of the legacy LTE system (FDD-LTE) wastes frequency resources due to the existence of unused resources in the heavy DL data traffic environment. To overcome the problem of low efficiency of the resource use in the heavy DL data traffic environment, UL frequency resources may be used as frequency resources for DL transmission at a specific time. Thus, resource use efficiency may be increased in the heavy DL data traffic environment. This is illustrated in detail along with buffer statuses for transmission in the Flexible FDD wireless transmission scheme in FIG. 11.

Figure 11:
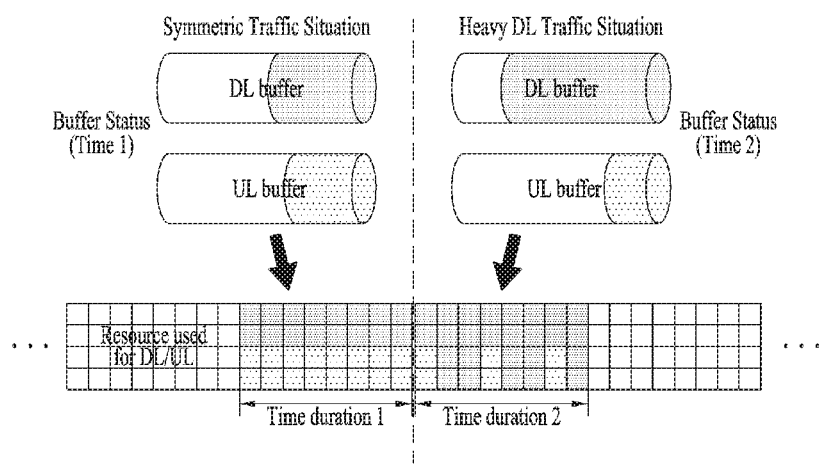
FIG. 11 is a diagram showing resource utilization in Flexible FDD.

FIG. 11 is a view illustrating resource utilization in the Flexible FDD scheme.

In FIG. 11, resource use efficiency may be more increased by using UL frequency resources as DL resources for DL transmission at a specific time in the heavy DL traffic environment, compared to the symmetric traffic situation.

As illustrated in FIG. 11, the Flexible FDD wireless transmission scheme refers to flexible configuration of DL frequency resources and UL frequency resources according to each service or application program. Herein, time resources may be configured in units of a time slot including one or more transmission symbols, a subframe, or a frame. Thus, wireless transmission resource allocation optimized for the characteristics of individual wireless terminal-wise services and applications may be supported, and total frequency use efficiency within any BS coverage may be increased, as well.

Figure 12:
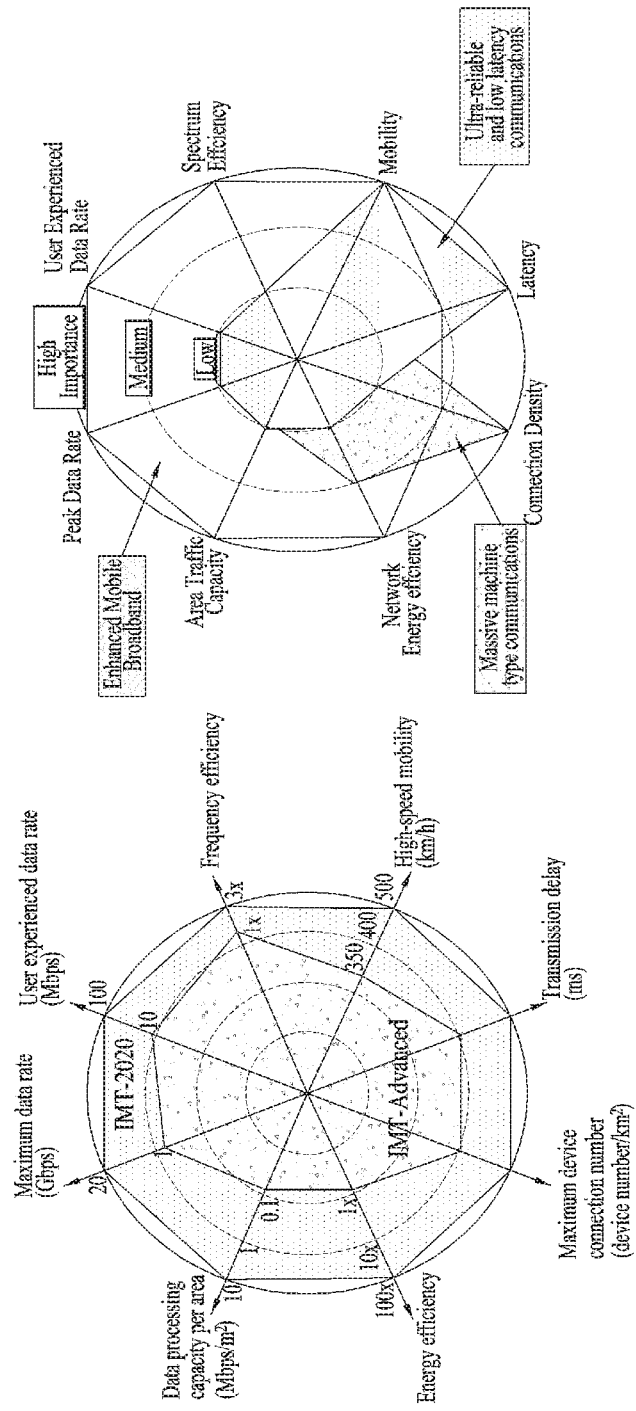
FIG. 12 is a diagram to describe association between IMT 2020 core performance requirements for 5G and per-service scenario 5G performance requirements.

FIG. 12 is a diagram to describe association between IMT 2020 core performance requirements for 5G and 5G performance requirements based on service scenarios.

FIG. 12 shows association between core performance requirements proposed by IMT 2020 for 5G and 5G performance requirements based on service scenarios.

Particularly, uMTC Service has very limited Over The Air (OTA) Latency Requirement and requires high mobility and high reliability (OTA Latency: <1 ms, Mobility: >500 km/h, BLER: <$10^{-6}$).

Figure 13:
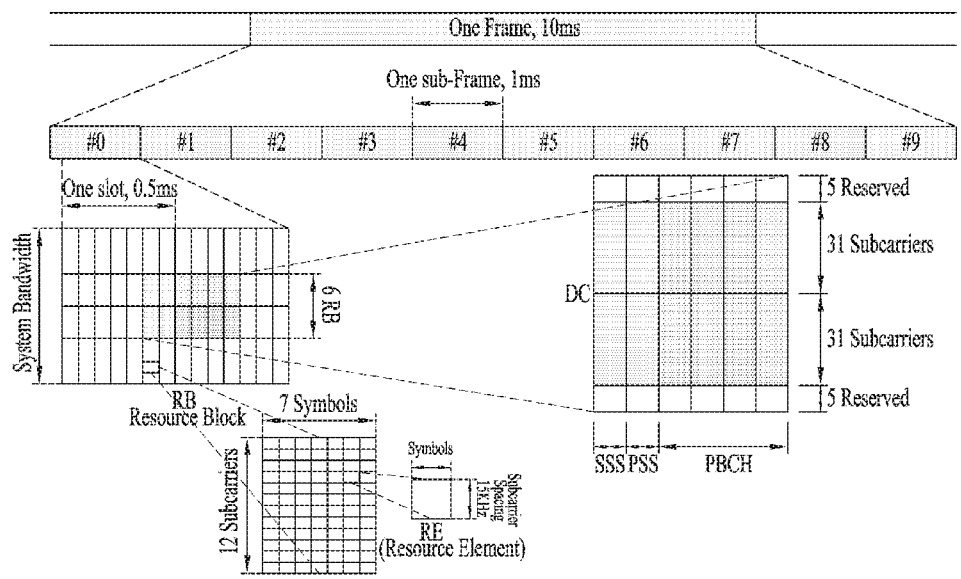
FIG. 13 is a diagram showing LTE/LTE-A frame structure.

FIG. 13 is a diagram showing LTE/LTE-A frame structure.

FIG. 13 shows the basic concept of a frame structure of LTE/LTE-A. A single frame is 10 ms and consists of 10 1-msec subframes. A single subframe consists of 2 0.5-msec slots, and a single slot consists of 7 Orthogonal Frequency Division Multiplexing (OFDM) symbols. 12 subcarriers having 15-kHz interval in-between and 7 OFDM symbols define a single Resource Block (RB). On center frequency 6 RBs, a base station transmits Primary Synchronization Signal (PSS) and Secondary Synchronization Signal (SSS) for synchronization and Physical Broadcast Channel (PBCH) for system information. Here, according to normal/extended Cyclic Prefix (CP) and Time Division Duplex/Frequency Division Duplex (TDD/FDD), there may be differences in the frame structure, signal and channel position.

Figure 14:
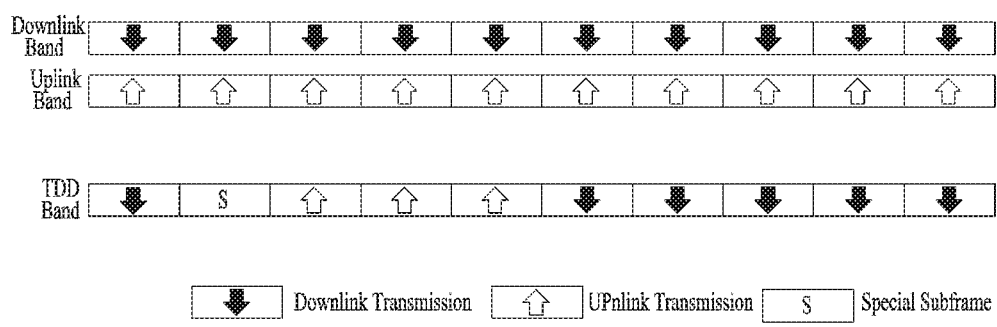
FIG. 14 is a diagram showing an example of FDD/TDD frame in LTE/LTE-A system.

FIG. 14 is a diagram showing an example of FDD/TDD frame in LTE/LTE-A system.

Referring to FIG. 14, in case of an FDDM frame structure, DL frequency band and UL frequency band are separated from each other. In case of a TDD frame structure, a DL region and a UL region are separated in a subframe unit within the same band.

Figure 15:
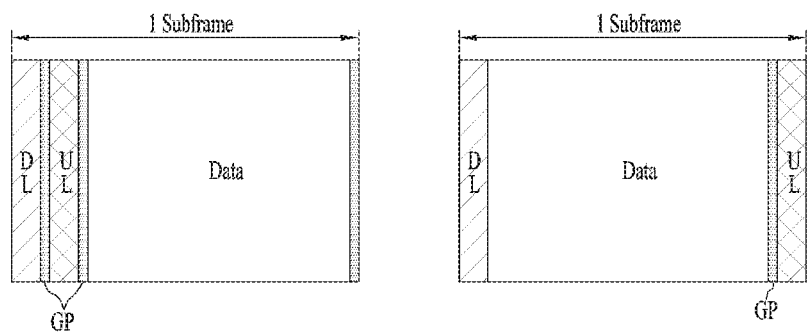
FIG. 15 is a diagram exemplarily showing a self-contained subframe structure.

FIG. 15 is a diagram exemplarily showing a self-contained subframe structure.

FIG. 15 shows a self-contained subframe structure to satisfy low delay requirements in the 5G performance requirements. Regarding the TDD based self-contained subframe structure, resource intervals (e.g., a DL control channel and a UL control channel) for DL and UL exist in a single subframe, and a Guard Period (GP) for solving a DL-UL interference problem and a resource interval for data transmission exist as well.

FIG. 15(a) shows one example of a self-contained subframe structure. A subframe is configured in order of resource intervals for DL-UL-data. And, a GP exists between the resource intervals. In FIG. 15(a), a DL resource interval denoted by DL may be a resource interval for a DL control channel and a UL resource interval denoted by UL may be a resource interval for a UL control channel.

FIG. 15(b) shows another example of a self-contained subframe structure. A subframe is configured in order of resource intervals for DL-data-UL. And, a GP exists in front of the UL resource interval only. In FIG. 15(b), a DL resource interval denoted by DL may be a resource interval for a DL control channel and a UL resource interval denoted by UL may be a resource interval for a UL control channel.

In the following description, methods for effectively applying a flexible duplex radio transmission scheme to a wireless transmission between a base station and a User Equipment (UE) are proposed. A base station mentioned overall in the present invention includes a relay, a relay node, a Remote Radio Head (RRH) and the like. Moreover, the present invention proposes a frame structure suitable for a flexible duplex radio transmission scheme and signaling according to the proposed frame structure.

FIG. 16 is a diagram showing an example of an interface of a flexible duplex operation of FDM.

FIG. 16(a) exemplarily shows an interface of a flexible duplex operation of FDM type in a paired spectrum. FIG. 16(b) exemplarily shows an interface of a flexible duplex operation of FDM type in an unpaired spectrum.

In order to operate a flexible duplex more efficiently, DL and UL portions in TDD or FDD band can be configured flexibly. In this case, in order to reduce interference generated between adjacent bands (or carriers), as shown in FIG. 16(a) or FIG. 16(b), a Guard Band (GB) can be disposed between DL and UL bands (or carriers). In FIG. 16(a), in order to operate a flexible duplex more efficiently, a DL region (DL) is assigned to a UL band. Moreover, in order to alleviate or cancel interference from an adjacent band (or carrier), various isolation and cancellation schemes can be added.

In New RAT (NR) of 5G, each base station may have a different DL/UL portion of a flexible duplex. Here, the portion means a part of a time-frequency resource. Namely, data environments (e.g., an environment having the characteristic of asymmetric data traffic) of UEs connected to each base station are different. To support this, each cell (e.g., a macro-cell, a small-cell, a femto-cell, etc.) may have a different DL/UL portion. Yet, as described above, a cell-specific flexible duplex operation may cause interference between adjacent base stations.

FIG. 17 is a diagram of an example to describe interference possibly generated when a base station operating by flexible duplex having a different DL/UL portion is located in an adjacent area.

FIG. 17 shows one example of inter-cell interference added when cells have different flexible duplex configurations. As shown in FIG. 17, serious interference between a DL transmitting cell and a UL receiving cell is additionally generated as well as interference between adjacent base stations in the legacy LTE. In this case, it is difficult to cancel or reduce such interference. Moreover, in case of an NR system in which a DL/UL portion of each cell is dynamically changed, it is further difficult to handle the interference dynamically changed according to time.

The present invention proposes a frame structure to adjust interference possibly generated between adjacent cells or between different systems located on adjacent bands during a cell-specific flexible duplex operation and also proposes a resource allocating method for supporting the proposed structure more effectively, interference measuring method therefor and signaling for the same. In the above-described interference environment, the rules explicitly stated in the following and combinations thereof are applicable for example.

Embodiment 1

For example, it is able to configure a DL only band and a UL only band (e.g., in subband unit) to alleviate dynamic characteristics of interference possibly generated between adjacent cells in case of a cell-specific flexible duplex operation.

As mentioned in the foregoing description, in case that a cell-specific flexible duplex operation is performed using different DL or UL portions available between adjacent cells, interference is generated dynamically as well. In order to drive an NR system, it is essential to manage interference generated between cells. In case of the legacy LTE system, it is possible to manage and cancel interference using various interference management schemes (e.g., schemes such as ICIC, eIMTA, etc.) of managing inter-cell interference generated from performing DL transmission or UL reception identically. Yet, as described above, in case that interference is dynamically generated, it is impossible to manage inter-cell interference by applying the schemes used in the LTE system only. Therefore, in order to minimize the impact caused to the NR system by the inter-cell interference, the present invention proposes a frame structure including a DL only band or a UL only band in a specific frequency region like the drawing proposed in the following. The DL only band means a band for DL transmission/reception only. The UL only band means a band for UL transmission/reception only. In the frame structure shown in the drawing described hereinafter, a time (t) may be a unit of a subframe, a frame or the like. And, a frequency (f) may be a unit of a subcarrier, a carrier or the like.

FIG. 18 is a diagram showing one example of a frame structure having a DL only band and a UL only band.

Referring to FIG. 18, UL only bands can be disposed on both edges of a bandwidth, respectively. And, a DL only band can be disposed on a center band of the bandwidth. DL band, UL band, GB and the like can be disposed on the rest of the bands.

FIG. 19 is a diagram showing one example when a DL/UL portion is changed in the frame structure having the DL only band and the UL only band shown in FIG. 18.

As described above, dynamic characteristics of a flexible duplex in a frame structure are lowered inevitably. Yet, since interference in a DL only region and a UL only region can be maintained intact despite performing a cell-specific flexible duplex operation, a gain may be generated in aspect of interference management. Referring to FIG. 19, a band denoted by DL/UL/GB may be configured with a DL and GB region or with a DL region, a UL region and a GB region. in this case, a size of each of the DL. UL and GB regions may differ in each frame structure.

Particularly, since serious impact may be caused to a system in case of decoding failure due to interference from an adjacent cell, a band, on which physical channels (e.g., Primary Synchronization Signal (PSS), Secondary Synchronization Signal (SSS), Physical Broadcasting CHannel (PBCH), Cell-specific Reference Signal (CRS), Physical Control Format Indicator CHannel (PCFICH), Physical Downlink Control Channel (PDCCH), Physical Downlink Shared Channel (PDSCH), Physical Random Access CHannel (PRACH), etc.) necessary for an initial access in an NR system exist, is inevitably vulnerable to inter-cell dynamic interference. Yet, when a cell-specific flexible duplex operation based on the frame structures proposed in FIGS. 18 and 19 is performed, as dynamic characteristics of interference are not generated from a specific frequency band, it is able to obtain a sufficient interference management gain through the inter-cell interference management scheme in the legacy LTE system. If a UE completes RRC_Connection in an JR system, a DL only band may not be further allocated.

For example, it is able to allocate the above-listed physical channels necessary for the initial access in the NR system to a DL only band and a UL only band in consideration of the aforementioned interference alleviation effect between adjacent cells.

The above-proposed frame structure is applicable to various frame structures (e.g., LTE-based frame structure operating in TDD/FDD, NR-based self-contained frame structure, etc.) capable of flexible duplex. One example of a frame structure applied to the self-contained structure shown in FIG. 15 is described as follows.

Figure 20:
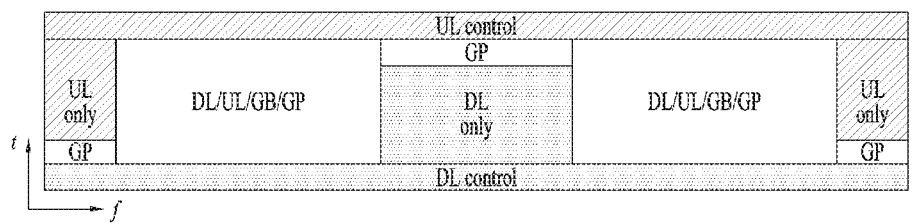
FIG. 20 is a diagram showing one example of a self-contained frame structure having a DL only band and a UL only band.

FIG. 20 is a diagram showing one example of a self-contained frame structure having a DL only band and a UL only band.

Referring to FIG. 20, when a DL control channel is assigned first (or to a prescribed number of first symbols) to a subframe of a self-contained frame structure in a time domain, if a DL control channel and a UL only band are adjacent to each other, it is able to allocate a GP between the DL channel and the UL only band. Moreover, in a subframe of a self-contained frame structure in a time domain, if a UL control channel is disposed last (or on a prescribed number of last symbols) and a DL only band is disposed adjacent to the UL control channel, a Guard Period (GP) can be allocated between the UL control channel and the DL only band.

Figure 21:
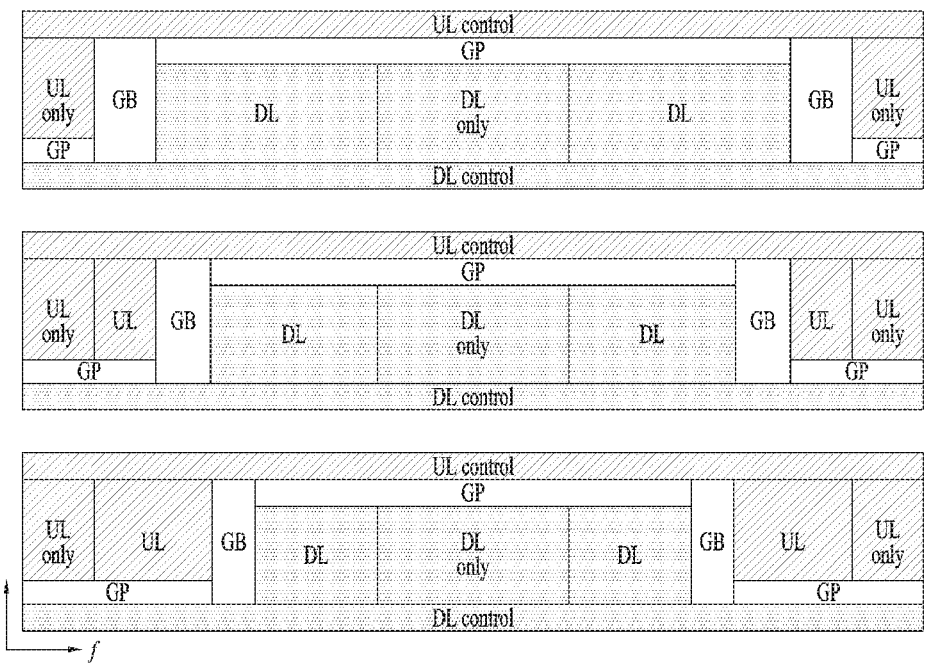
FIG. 21 is a diagram showing one example when a DL/UL portion is changed in a self-contained frame structure having a DL only band and a UL only band.

FIG. 21 is a diagram showing one example when a DL/UL portion is changed in a self-contained frame structure having a DL only band and a UL only band.

Compared with the frame structure shown in FIG. 20, the frame structures shown in FIG. 21 differ in the configuration of a band denoted by DL/UL/GB/GP. The band denoted by DL/UL/GB/GP may be configured with DL/GB/GP or DL/UL/GB/GP region. In this case, a size of each of the DL, UL, GB and GP regions may differ per frame structure.

In order to raise the resource efficiency in Embodiment 1, some symbols are usable as DL band and UL band, which is described with reference to the accompanying drawing as follows.

Figures 22, 23:
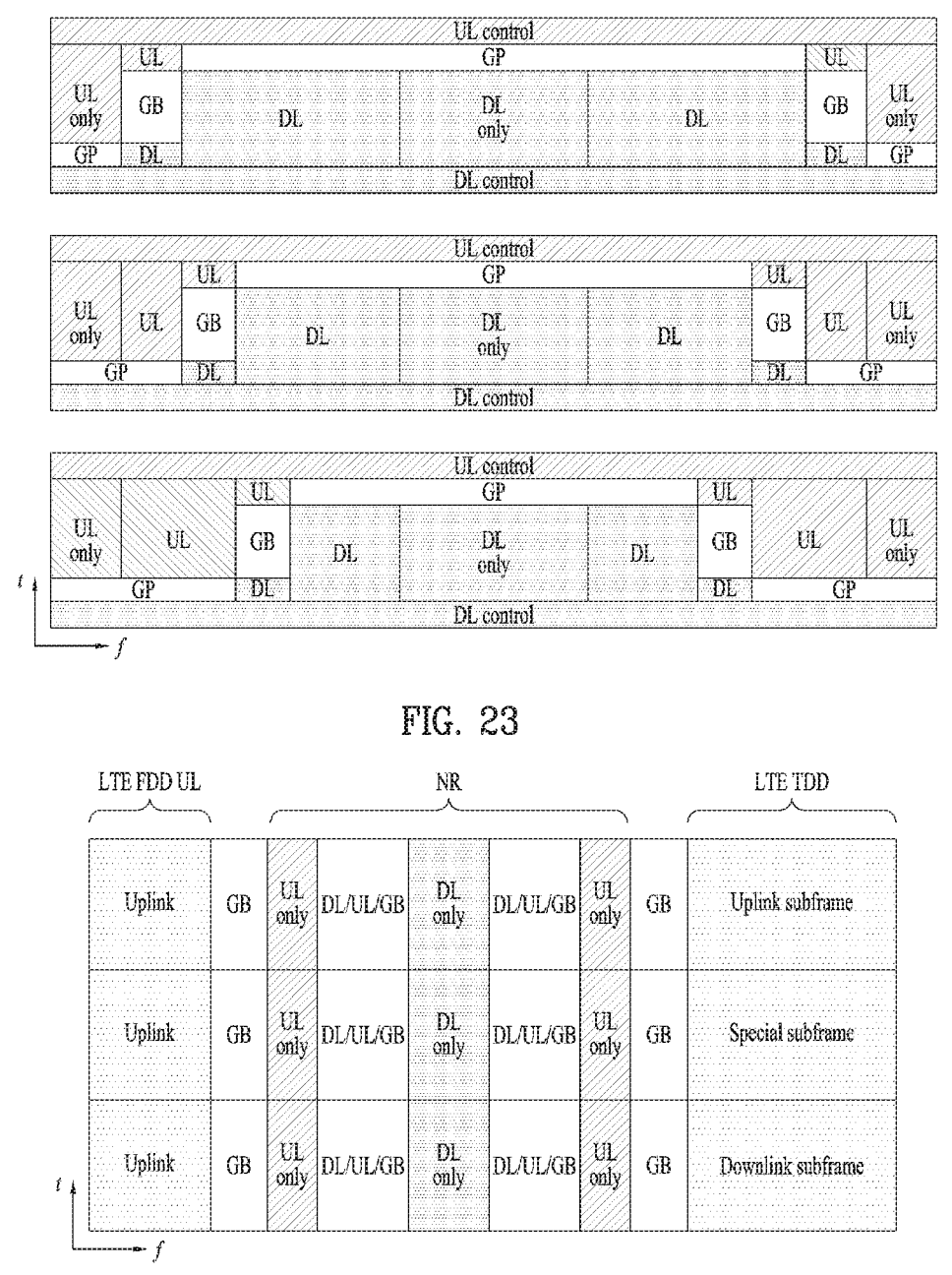

FIG. 22 is a diagram showing one example when a DL/UL portion is changed in a self-contained frame structure having a DL only band and a UL only band.

The example of FIG. 22 relates to an example when a DL only band and a UL only band are disposed at a center frequency and an edge frequency, respectively. Yet, locations of the DL only band and the UL only band can be changed. Moreover, the example of FIG. 22 relates to an example when 1 DL only band and 2 UL only bands are configured. Yet, the number of the DL/UL only band can be changed. Moreover, either the DL only band or the UL only band can be configured and such configurations are switchable.

Embodiment 1-1

As one example of Embodiment 1, in order to pair locations of a DL only band and a UL only band between adjacent cells in the aforementioned frame structure, if an interference receiving base station receives interference higher than a specific threshold from an interference giving base station or reliability of a received signal becomes lower than the specific threshold, the interference receiving base station may inform the interference giving base station of the following information through predefined signaling (e.g., backhaul included). For the effective management of interference, it is apparent that DL only band and UL only band of different base stations should be matched. For the resource allocation in consideration of interference to an adjacent cell, the following information can be included.

For one example, (1) cell physical identifier information of a base station giving interference of strength higher than a preset threshold and/or (2) location information of DL/UL only band and/or (3) location information of GB and/or (4) index information containing location informations of the DL/UL only band and GB and/or (5) flexible duplex capable time/frequency resource information and/or (6) interference or transmit power level information of flexible duplex capable time/frequency can be included.

For another example, (1) cell physical identifier information of a base station receiving interference of strength higher than a preset threshold and/or (2) location information of DL/UL only band and/or (3) location information of GB and/or (4) index information containing location informations of the DL/UL only band and GB and/or (5) flexible duplex capable time/frequency resource information and/or (6) interference or transmit power level information of flexible duplex capable time/frequency can be included.

Embodiment 1-2

As another example of Embodiment 1, in order to pair locations of a DL only band and a UL only band between adjacent cells in the aforementioned frame structure, if an interference giving base station gives interference higher than a specific threshold to an interference receiving base station, the interference giving base station may inform the interference receiving base station of the following information through predefined signaling (e.g., backhaul included). For the effective management of interference, it is apparent that DL only band and UL only band of different base stations should be matched. For the resource allocation in consideration of interference to an adjacent cell, the following information can be included.

For one example, (1) cell physical identifier information of a base station giving interference of strength higher than a preset threshold and/or (2) location information of DL/UL only band and/or (3) location information of GB and/or (4) index information containing location informations of the DL/UL only band and GB and/or (5) flexible duplex capable time/frequency resource information and/or (6) interference or transmit power level information of flexible duplex capable time/frequency can be included.

For another example, (1) cell physical identifier information of a base station receiving interference of strength higher than a preset threshold and/or (2) location information of DL/UL only band and/or (3) location information of GB and/or (4) index information containing location informations of the DL/UL only band and GB and/or (5) flexible duplex capable time/frequency resource information and/or (6) interference or transmit power level information of flexible duplex capable time/frequency can be included.

In order to perform the above-described Embodiment 1, based on the informations of Embodiment 1, (1) if resource allocation for configuring a DL only band and a UL only band is performed and/or (2) if an interference giving base station is performing a flexible duplex of FDM, it is able to change into a flexible duplex of TDM or increase a radio resource rate for the UL usage.

Embodiment 2

In order to operate a cell-specific flexible duplex based on the frame structure including a DL only band and a UL only band, a base station can signal information on locations and bandwidths of the configured DL only band, UL only band and GB to a UE by broadcasting.

For example, in order to operate a frame structure including a DL only band and a UL only band, DL/UL resource allocations of various types are necessary for each symbol in the same subframe. In order to operate it effectively, a base station does not perform resource allocation per symbol. Instead, the base station signals locations and sizes of a DL only band and a UL only band and a location and size of GB, which are operated in a cell, by broadcasting, thereby enabling all UEs accessing the cell to operate within a determined frame structure. Thereafter, resource allocation of DL and UL is performed on a UE in a PRB unit like the existing method and a resource can be allocated by being punctured on the basis of the already-known frame structure.

For example, a base station can inform a UE of information on locations and bandwidths of a DL only band, a UL only band and a GB in form of index in order to reduce overhead.

Embodiment 3

In order to alleviate the dynamic characteristics of interference possibly generated between adjacent cells during a cell-specific flexible duplex operation, it is able to manage a DL only band and a UL only band in a specific cell group unit. Embodiment 1 assumes a case that all cells have the same frame structure. When a frame structure proposed by the present invention is operated, as a GB exists between a DL only band and a UL only band, it is disadvantageous in that spectral efficiency is reduced. Yet, after cells possibly causing serious interference to each other have been groups in consideration of interference measured between cells, a cell belonging to the corresponding group operates a frame structure having a specific DL/UL only band configured therein, whereby resource efficiency can be raised.

Embodiment 4

In order to effectively operate a cell-specific flexible duplex operation based on a frame structure including a DL only band and a UL only band with the legacy LTE system, it is able to consider an embodiment that a UL only band location is disposed on an adjacent band side.

When a DL transmission is performed, out-of-band emission occurs on an adjacent band. Since a first RAT (e.g., LTE system) does not consider impact when a second RAT (e.g., NR system) exists on an adjacent band, the NR system needs to minimize the impact on the legacy LTE system. Therefore, the NR system performs DL transmission toward a side distant from a band of the legacy system, thereby minimizing out-of-band emission. Moreover, by configuring a UL only band on an adjacent band side, it is able to play a role as a guard band during a UL reception in the legacy LTE TDD/FDD system.

FIG. 23 is a diagram showing one example of configuring a UL only region to reduce interference caused to LTE system located on an adjacent band in a self-contained frame structure having a DL only band and a UL only band.

In FIG. 23, if an LTE FDD UL band and an KTE TDD band exist on an adjacent band, a UL only band can be configured to minimize interference from an NR system to an LTE system.

In the above embodiment, a DL only band location is changeable. Moreover, inter-user interference may be generated between UEs performing DL reception in an LTE system of an adjacent band in a DL subframe of an LTE TDD system, which can be resolved by cross-system scheduling between the NR system and the LTE TDD system. And, the above embodiment is applicable to an NR system on the basis of a self-contained frame structure.

Embodiment 4-1

As one example of Embodiment 4, in order to pair locations of a DL only band and a UL only band in the form shown in FIG. 23 with an LTE system located on an adjacent band in the frame structure shown in FIG. 23, if an interference receiving base station of an LTE system receives interference higher than a specific threshold from an interference giving base station of an NR system or reliability of a received signal becomes lower than the specific threshold, the LTE system base station measuring the interference can inform the NR system base station giving major interference of the following information through predefined signaling (e.g., backhaul signaling included).

For the effective management of interference, it is apparent that DL only band and UL only band of the respective base stations operating in different systems should be matched. For the resource allocation in consideration of interference to such a system located on such an adjacent band, the following information can be included.

(1) Cell physical identifier information of an NR system base station giving interference of strength higher than a preset threshold and/or (2) location information of DL/UL only band and/or (3) location information of GB and/or (4) index information containing location informations of the DL/UL only band and GB and/or (5) flexible duplex capable time/frequency resource information and/or (6) interference or transmit power level information of flexible duplex capable time/frequency can be included.

Or, (1) cell physical identifier information of a legacy LTE system base station receiving interference of strength higher than a preset threshold and/or (2) location information of DL/UL only band and/or (3) location information of GB and/or (4) index information containing location informations of the DL/UL only band and GB and/or (5) flexible duplex capable time/frequency resource information and/or (6) interference or transmit power level information of flexible duplex capable time/frequency can be included.

Embodiment 4-2

As one example of Embodiment 4, in order to pair locations of a DL only band and a UL only band in the explicitly stated form with an LTE system located on an adjacent band in the frame structure shown in FIG. 23, if an interference receiving base station of an LTE system gives interference higher than a specific threshold from an interference giving base station of an NR system, the LTE system base station can inform the NR system base station giving major interference of the following information through predefined signaling (e.g., backhaul included).

For the effective management of interference, it is apparent that DL only band and UL only band of the respective base stations operating in different systems should be matched. For the resource allocation in consideration of interference to such a system located on such an adjacent band, the following information can be included.

(1) Cell physical identifier information of an NR system base station giving interference of strength higher than a preset threshold and/or (2) location information of DL/UL only band and/or (3) location information of GB and/or (4) index information containing location informations of the DL/UL only band and GB and/or (5) flexible duplex capable time/frequency resource information and/or (6) interference or transmit power level information of flexible duplex capable time/frequency can be included.

Or, (1) cell physical identifier information of a legacy LTE system base station receiving interference of strength higher than a preset threshold and/or (2) location information of DL/UL only band and/or (3) location information of GB and/or (4) index information containing location informations of the DL/UL only band and GB and/or (5) flexible duplex capable time/frequency resource information and/or (6) interference or transmit power level information of flexible duplex capable time/frequency can be included.

In order to perform the proposal in Embodiment 4, based on the informations of Embodiment 4, (1) if resource allocation for configuring a DL only band and a UL only band is performed and/or (2) if an interference giving NR system base station is performing a flexible duplex of FDM, it is able to change it into a flexible duplex of TDM or increase a radio resource rate for the UL usage.

Embodiment 5

In order to effectively operate a cell-specific flexible duplex operation based on a frame structure including a DL only band and a UL only band on a different operator band, the same DL or UL only band location can be provided to an adjacent band between operators.

A DL only band or a UL only band can be configured for each operator. Locations of base stations respectively operated by operators may be adjacent to each other. In this case, when different transmissions (e.g., Operator1:DL/Operator2:UL or Operator1:UL/Operator2:DL) are performed by operators using an adjacent band, respectively, interference between the operators may be seriously generated. Therefore, like the following embodiment, by aligning the same DL or UL only band location on an adjacent band between operators, it is able to alleviate inter-operator interference.

Figure 24:
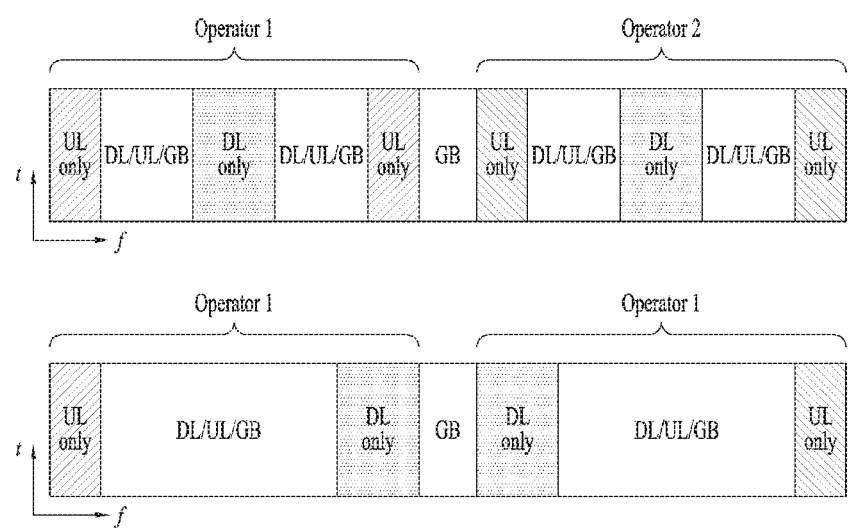
FIG. 24 is a diagram showing one example of configuring a same DL only region or UL only region to reduce interference between adjacent operators in a self-contained frame structure having a DL only band and a UL only band.

FIG. 24 is a diagram showing one example of configuring a same DL only region or UL only region to reduce interference between adjacent operators in a self-contained frame structure having a DL only band and a UL only band.

In FIG. 24, a DL only band location and a UL only band location are changeable. Moreover, even if an adjacent operator is the legacy LTE TDD/FDD system as well as NR, the scheme of Embodiment 4 is applicable. In a DL subframe of an adjacent operator, interference may be generated between UEs performing DL receptions in an adjacent LTE system, which can be resolved by cross-operator scheduling between an operator and another NR system or LTE TDD system. Embodiment 5 is applicable to an NR system based on a self-contained frame structure.

Embodiment 5-1

As one example of Embodiment 5, in order to pair locations of a DL only band and a UL only band in the form shown in FIG. 24 with a system operating on a different operator band located on an adjacent band in the frame structure shown in FIG. 24, if an interference receiving base station of a system operating on a different operator band receives interference higher than a specific threshold from an interference giving base station of an NR system on UL reception or reliability of a received signal becomes lower than the specific threshold, the base station of the system operating on the different operator band and measuring interference can inform the NR system base station giving major interference of the following information through predefined signaling (e.g., backhaul included).

For the effective management of interference, it is apparent that DL only band and UL only band of each base station operating on a different operator band should be matched. For the resource allocation in consideration of interference to such a system operating on a different operator band located on such an adjacent band, the following information can be included.

(1) Cell physical identifier information of an NR system base station giving interference of strength higher than a preset threshold and/or (2) location information of DL/UL only band and/or (3) location information of GB and/or (4) index information containing location informations of the DL/UL only band and GB and/or (5) flexible duplex capable time/frequency resource information and/or (6) interference or transmit power level information of flexible duplex capable time/frequency can be included.

Or, (1) cell physical identifier information of a base station of a system operating on a different operator band, which receives interference of strength higher than a preset threshold, and/or (2) location information of DL/UL only band and/or (3) location information of GB and/or (4) index information containing location informations of the DL/UL only band and GB and/or (5) flexible duplex capable time/ frequency resource information and/or (6) interference or transmit power level information of flexible duplex capable time/frequency can be included.

Embodiment 5-2

As one example of Embodiment 5, in order to pair locations of a DL only band and a UL only band in the form shown in FIG. 24 with a system operating on a different operator band located on an adjacent band in the frame structure shown in FIG. 24, if an interference receiving base station of a system operating on a different operator band gives interference higher than a specific threshold from an interference giving base station of an NR system on DL transmission, the base station of the system operating on the different operator band can inform the NR system base station giving major interference of the following information through predefined signaling (e.g., backhaul included).

For the effective management of interference, it is apparent that DL only band and UL only band of each base station operating in a different system should be matched. For the resource allocation in consideration of interference to such a system operating on a different operator band located on such an adjacent band, the following information can be included.

(1) Cell physical identifier information of an NR system base station giving interference of strength higher than a preset threshold and/or (2) location information of DL/UL only band and/or (3) location information of GB and/or (4) index information containing location informations of the DL/UL only band and GB and/or (5) flexible duplex capable time/frequency resource information and/or (6) interference or transmit power level information of flexible duplex capable time/frequency can be included.

(1) Cell physical identifier information of a base station of a system operating on a different operator band, which receives interference of strength higher than a preset threshold, and/or (2) location information of DL/UL only band and/or (3) location information of GB and/or (4) index information containing location informations of the DL/UL only band and GB and/or (5) flexible duplex capable time/ frequency resource information and/or (6) interference or transmit power level information of flexible duplex capable time/frequency can be included.

In order to perform the proposals in Embodiment 5, based on the informations of Embodiment 5, (1) if resource allocation for configuring a DL only band and a UL only band is performed and/or (2) if an interference giving NR system base station is performing a flexible duplex of FDM, it is able to change it into a flexible duplex of TDM or increase a radio resource rate for the UL usage.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

A method of allocating a resource for controlling inter-cell interference in a wireless communication system operating in flexible duplex mode per cell and apparatus therefor are industrially applicable to various kinds of wireless communication systems such as 3GPP LTE/LTE-A system, 5G system, etc.

What is claimed is:

1. A method of allocating a resource for a base station to control inter-cell interference in a wireless communication system operating in flexible duplex mode per cell, the method comprising:
receiving information on a resource only for downlink allocated for an adjacent cell having an adjacent base station belong thereto in a prescribed subframe from the adjacent base station; and
allocating a resource of a cell, to which the base station belongs, corresponding to the resource only for the downlink allocated to the adjacent cell to user equipments within the base station belonging cell as a resource only for downlink based on the information on the resource,
wherein the resource only for the downlink allocated to the base station belonging cell is allocated to a partial frequency band in a bandwidth of the prescribed subframe.

2. The method of claim 1, wherein based on bandwidths used by the wireless communication system and a different wireless communication being are adjacent to both edges of the bandwidth, both edge bands of the bandwidth are allocated as a resource only for uplink.

3. The method of claim 1, wherein the information on the resource further includes one of an identifier of the adjacent base station, information on a Guard Band (GB), time information operating in the flexible duplex mode, and frequency information operating in the flexible duplex mode.

4. The method of claim 3, further comprising transmitting the information on the resource to the UE within the base station belonging cell.

5. The method of claim 1, wherein both edge bands of the prescribed subframe are allocated as a resource only for uplink.

6. The method of claim 1, wherein when the adjacent base station receives uplink, based on a level of interference caused to the adjacent base station by the base station exceeding a prescribed threshold, the information on the resource is received from the adjacent base station.

7. The method of claim 1, wherein based on a reliability of a signal received by the adjacent base station becoming lower than a prescribed threshold, the information on the resource is received from the adjacent base station.

8. A base station in performing resource allocation to control inter-cell interference in a wireless communication system operating in flexible duplex mode per cell, the base station comprising:
a transmitter;
a receiver; and
at least one processor coupled with the transmitter and the receiver,
wherein the at least one processor is configured to:
control the receiver to receive information on a resource only for downlink allocated for an adjacent cell having an adjacent base station belong thereto in a prescribed subframe from the adjacent base station; and
allocate a resource of a cell, to which the base station belongs, corresponding to the resource only for the downlink allocated to the adjacent cell to user equipments within the base station belonging cell as a resource only for downlink based on the information on the resource,
wherein the resource only for the downlink allocated to the base station belonging cell is allocated to a partial frequency band in a bandwidth of the prescribed subframe.

9. The base station of claim 8, wherein based on bandwidths used by the wireless communication system and a different wireless communication system being adjacent to both edges of the bandwidth, the processor allocates both edge bands of the bandwidth as a resource only for uplink.

10. The base station of claim 8, wherein the information on the resource further includes one of an identifier of the adjacent base station, information on a Guard Band (GB), time information operating in the flexible duplex mode, and frequency information operating in the flexible duplex mode.

11. The base station of claim 10, wherein the at least one processor is further configured to control the transmitter to transmit the information on the resource to the UE within the base station belonging cell.

12. The base station of claim 8, wherein the processor allocates both edge bands of the prescribed subframe as a resource only for uplink.

13. The base station of claim 8,
wherein when the adjacent base station receives uplink, based on a level of interference caused to the adjacent base station by the base station exceeding a prescribed threshold, the receiver receives the information on the resource from the adjacent base station and
wherein based on a reliability of a signal received by the adjacent base station becoming lower than a prescribed threshold, the receiver receives the information on the resource from the adjacent base station.

* * * * *